(12) United States Patent
Xie

(10) Patent No.: US 11,765,317 B2
(45) Date of Patent: Sep. 19, 2023

(54) INFORMATION PROCESSING METHOD, DEVICE, AND ELECTRONIC EQUIPMENT

(71) Applicant: AAC Acousitc Technologies (Shanghai)Co., Ltd., Shanghai (CN)

(72) Inventor: Bing Xie, Shenzhen (CN)

(73) Assignee: AAC Acoustic Technologies (Shanghai)Co., Ltd., Shanghai (CN)

( * ) Notice: Subject to any disclaimer, the term of this patent is extended or adjusted under 35 U.S.C. 154(b) by 0 days.

(21) Appl. No.: 17/563,038

(22) Filed: Dec. 27, 2021

(65) Prior Publication Data
US 2022/0345662 A1    Oct. 27, 2022

(30) Foreign Application Priority Data
Apr. 26, 2021    (CN) .......................... 202110453463.3

(51) Int. Cl.
*G08B 6/00* (2006.01)
*H04N 5/93* (2006.01)

(52) U.S. Cl.
CPC ............. *H04N 5/9305* (2013.01); *G08B 6/00* (2013.01)

(58) Field of Classification Search
CPC .............. H04N 5/9305; H04N 9/8205; H04M 2250/12
USPC ......................................................... 386/239
See application file for complete search history.

(56) References Cited

U.S. PATENT DOCUMENTS

| | | | |
|---|---|---|---|
| 11,493,993 B2 * | 11/2022 | Rubin | G06F 3/011 |
| 2016/0162028 A1 * | 6/2016 | Lacroix | G11B 27/34 386/239 |
| 2018/0255294 A1 * | 9/2018 | Sen | H04N 21/4394 |
| 2022/0031239 A1 * | 2/2022 | Curtis | G16H 80/00 |

* cited by examiner

*Primary Examiner* — Helen Shibru
(74) *Attorney, Agent, or Firm* — W&G Law Group (57) ABSTRACT

The present invention provides an information processing method, including steps of: obtaining multimedia information; obtaining environmental information corresponding to the multimedia information. According to multimedia information and environmental information, determine the tactile feedback. When a tactile multimedia output operation is received, out multimedia information. At the same time, output the corresponding tactile feedback effect. The present invention can enable the user to experience not only visual and/or auditory information but also tactile information when listening to or watching multimedia information.

8 Claims, 4 Drawing Sheets

INFORMATION PROCESSING METHOD, DEVICE, AND ELECTRONIC EQUIPMENT

FIELD OF THE PRESENT DISCLOSURE

The present invention relates to the field of electronic technology, and in particular to an information processing method, device, and electronic equipment performing the information processing method.

DESCRIPTION OF RELATED ART

For photos, videos, audios, etc. in the prior art, the dimensions that users experience when watching or listening are all less. For example, users can only experience information in visual dimensions when viewing photos. When the user listens to the audio, he can only experience the information of the auditory dimension.

Therefore, it is necessary to provide an information processing method so that users can experience more dimensional information.

SUMMARY OF THE PRESENT INVENTION

One of the main objects of the present invention is to provide an information processing method which enables user to experience not only visual and/or auditory information but also tactile information when listening to or watching multimedia information.

To achieve the above-mentioned objects, the present invention provides an information processing method, including:
  obtaining multimedia information;
  obtaining environmental information corresponding to the multimedia information;
  determining tactile feedback according to the multimedia information and the environmental information;
  when a tactile multimedia output operation is received, outputting the multimedia information, and outputting a tactile feedback effect corresponding to the tactile feedback at the same time.

Further, the step of determining the tactile feedback according to the multimedia information and the environmental information includes:
  determining the tactile feedback through a preset strategy according to the multimedia information and the environmental information.

Further, the tactile feedback includes a vibration frequency, a vibration intensity, and a vibration speed; the step of outputting of the tactile feedback effect corresponding to the tactile feedback includes:
  controlling a vibration member to vibrate in accordance with the vibration frequency, the vibration intensity, and the vibration speed.

Further, the tactile feedback further includes a target temperature; the step of controlling the vibration member according to the vibration frequency, the vibration intensity, and the vibration speed includes:
  controlling the vibration member in accordance with the vibration frequency, the vibration intensity, and the vibration speed;
  controlling the temperature of a temperature control component for reaching the target temperature.

In addition, the information processing method further includes a step after determining the tactile feedback according to the multimedia information and the environmental information:
  according to the multimedia information and the tactile feedback, determining a tactile multimedia file;
  before the step of outputting of the multimedia information and the tactile feedback effect corresponding to the tactile feedback at the same time, the method further includes a step:
  according to the tactile multimedia file, obtaining the multimedia information and the tactile feedback.

In addition, the information processing method further includes a step after the step of determining the tactile feedback according to the multimedia information and the environmental information:
  storing the multimedia information and the tactile feedback in association;
  before the step of outputting of the multimedia information and the tactile feedback effect corresponding to the tactile feedback at the same time, the method further includes a step:
  obtaining the multimedia information and the tactile feedback stored in association.

In addition, the step of obtaining of multimedia information includes:
  when receiving record instruction or shooting instructions, obtaining the multimedia information by recording or shooting;
  the step of obtaining environmental information corresponding to the multimedia information includes:
  in the process of recording or shooting to obtain multimedia information, obtaining the environmental information of the current environment.

The present invention further provides an information processing device including:
  a first obtaining module for obtaining a multimedia information;
  a second obtaining module for obtaining an environmental information corresponding to the multimedia information;
  a determining module for determining tactile feedback according to the multimedia information and the environmental information;
  an output module for outputting the multimedia information when receiving the tactile multimedia output operation, and at the same time outputting tactile feedback effect corresponding to the tactile feedback.

The present invention further provides an electronic equipment, including a memory, a processor, and a computer program stored in the memory and running on the processor; wherein: the processor implements steps of the information processing method as described above.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
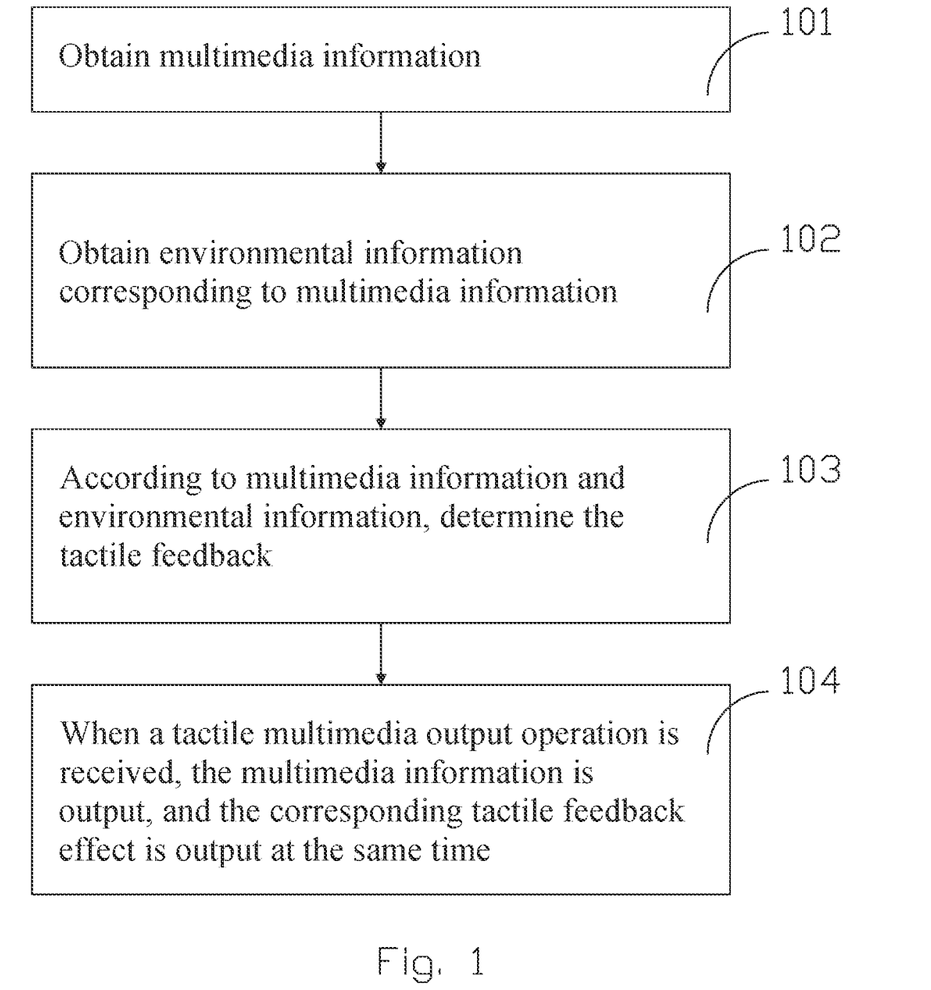
FIG. 1 is a flow chart of an information processing method in accordance with a first exemplary embodiment of the present invention.

Please refer to FIG. 1. An information processing method provided by the embodiment of the present invention, includes steps of:

101. Obtain multimedia information.

The execution subject of this embodiment is an information processing device. The information processing device may be electronic equipment. The information processing device can also be integrated in electronic equipment. In the following, the information processing device is used as electronic equipment for further description.

Wherein, multimedia information can include audio, video, pictures, etc.

Take multimedia information as a video as an example. the multimedia information can be recorded by electronic equipment. It can also be obtained by electronic equipment from other electronic equipment.

For example, the corresponding image information can be recorded through the camera of the electronic equipment, and the corresponding sound information can be recorded through the sound sensor (such as a microphone) of the electronic equipment, so that the electronic equipment can obtain the video.

102. Obtain environmental information corresponding to multimedia information.

Wherein, the environmental information corresponding to the multimedia information may be the environmental information of the environment in which the electronic equipment from which the multimedia information was recorded or photographed during the recording or photographing of the multimedia information. The environmental information can be collected by one or more environmental sensors. For example, the environmental sensor can include: temperature sensor, humidity sensor, air pressure sensor, wind speed sensor or sound sensor (such as microphone), etc.

Environmental information can include: Temperature information, humidity information, air pressure information, light information, wind speed information, wind level, sound information, etc.

It should be noted that the above are only a few examples of environmental information, and are not intended to limit the present invention.

For example, in the process of recording or shooting to obtain multimedia information, various environmental sensors can be used to obtain the environmental information of the current environment of the electronic equipment.

In the embodiment of the present invention, multiple means "two types" or "two or more types".

In some embodiments, it is possible to obtain the environmental information obtained by other electronic equipment through a variety of environmental sensors during the recording or shooting of multimedia information.

In some embodiments, different multimedia information corresponds to different environmental information. For example, taking multimedia information as a video as an example, the multimedia information can be divided into multiple types of videos such as sea view video, mountain view video, and firework video in advance, and the corresponding environmental information can be determined for each type of video. When the multimedia information is obtained, the type corresponding to the multimedia information can be determined, and the environmental information corresponding to the video of this type can be determined. Use the environmental information as the environmental information of the multimedia information.

103. According to multimedia information and environmental information, determine the tactile feedback.

Wherein, the tactile feedback can include one or more tactile feedback parameters. The tactile feedback parameter can be vibration frequency, vibration intensity, vibration speed, temperature, humidity, viscosity, roughness, smoothness, voltage intensity or current intensity, etc.

It should be noted that the above are only a few examples of tactile feedback, and are not used to limit the present invention. Any other information that can be felt by contact can be used as tactile feedback, and the actual needs shall prevail.

In the embodiment of the present invention, multiple means "two" or "two or more".

104. When a tactile multimedia output operation is received, the multimedia information is output, and the corresponding tactile feedback effect is output at the same time.

Wherein, the tactile multimedia output operation can be touch operation or non-contact operation.

For example, the tactile multimedia output operation can be triggered for the user to click the corresponding position on the screen of electronic equipment. For example, the screen of electronic equipment can display multiple logos corresponding to multimedia information. When the user clicks on the logo corresponding to a certain multimedia information, the electronic equipment receives the tactile multimedia output operation. The electronic equipment can respond to the tactile multimedia output operation, output the multimedia information corresponding to the mark, and output the corresponding tactile feedback corresponding to the tactile feedback effect at the same time. It is understandable that the corresponding tactile feedback is generated according to the multimedia information and the environmental information corresponding to the multimedia information.

For example, tactile multimedia output operations can trigger corresponding gestures for users. For example, after acquiring the multimedia information, a gesture input by the user may be received, and the gesture may be stored in association with the multimedia information. Then, when the gesture input by the user is received, it can be detected whether the gesture is the same as the gesture stored in association with the multimedia information. If the gesture is the same as the gesture stored in association with the multimedia information, the electronic equipment receives the tactile multimedia output operation.

Wherein, the effect of tactile feedback can be a certain degree of vibration, a certain degree of electrical stimulation, a certain degree of temperature, and so on.

For example, assuming that multimedia information is a video, when a tactile multimedia output operation is received, the video can be played and the corresponding tactile feedback effect can be output at the same time; thus, it can bring users a three-dimensional experience of sight, hearing and touch.

For example, assuming that multimedia information is a picture, the picture can be displayed when a tactile multimedia output operation is received. At the same time, the corresponding tactile feedback effects are output, which can bring users an experience in two dimensions, visual and tactile.

In the embodiment of the present invention, multimedia information is obtained. Obtain environmental information corresponding to the multimedia information. According to the multimedia information and the environmental information, determine the tactile feedback. When a tactile multimedia output operation is received, the multimedia information is output, and the tactile feedback effect corresponding to the tactile feedback is output at the same time. In this way, when users listen to or watch multimedia information, they can experience not only visual and/or auditory information, but also tactile information.

In some embodiment, according to multimedia information and environmental information, determine the tactile feedback, which can include:

According to the multimedia information and environmental information, through the preset strategy, determine the tactile feedback.

Wherein, for different multimedia information, developers can set different strategies in advance to obtain corresponding tactile feedback. Tactile feedback corresponding to a certain multimedia information can be used as an embodiment of the multimedia information. For example, assuming that multimedia information is a seascape picture, the seascape in the seascape picture can be reflected by the corresponding vibration frequency, vibration intensity, and vibration speed. For another example, assuming that multimedia information is a firework show video, the fireworks in the firework show video can be reflected through the corresponding vibration frequency, vibration intensity, and vibration speed. Electronic equipment can pre-store the corresponding relationship between the multimedia information and strategy.

Wherein, for different environmental information, developers can pre-set different strategies to obtain corresponding tactile feedback, and electronic equipment can pre-store the corresponding relationship between environmental information and strategies.

After obtaining the multimedia information and the environmental information, the strategy corresponding to the multimedia information and the strategy corresponding to the environmental information can be obtained and used as the preset strategy. Subsequently, according to the multimedia information and the environmental information, through the preset strategy, determine the tactile feedback.

For example, assuming that multimedia information is a seascape picture, the environmental information corresponding to the seascape picture may include wind speed information and temperature information. The electronic equipment pre-stores the strategy corresponding to the seascape picture, the strategy corresponding to the wind speed information, and the strategy corresponding to the temperature information. For example, assuming that the strategies corresponding to a seascape image are vibration frequency F1, vibration intensity S1, and vibration speed V1. The corresponding strategy for wind speed information is the mapping relationship between wind speed and vibration frequency, vibration intensity, and vibration speed. The strategy corresponding to the temperature information is the mapping relationship between the environmental temperature and the temperature of the electronic equipment. Then, the vibration frequency can be determined as F1, the vibration intensity is S1, and the vibration speed is V1 through the seascape picture. The ambient wind speed can be determined by the wind speed information, and then according to the mapping relationship between the wind speed and the vibration frequency, vibration intensity, and vibration speed respectively, the vibration frequency F2, the vibration intensity S2, and the vibration speed V2 corresponding to the environmental wind speed can be determined. The environmental temperature can be determined by the temperature information. Then, according to the mapping relationship between the environmental temperature and the temperature of the electronic equipment, determine the temperature T1 of the electronic equipment corresponding to the environmental temperature.

When the vibration frequency F1 is equal to the vibration frequency F2, the vibration intensity S1 is equal to the vibration intensity S2, and the vibration speed V1 is equal to the vibration speed V2. The electronic equipment can vibrate according to vibration frequency F2, vibration intensity S2, and vibration speed V2, and control its temperature to reach temperature T1.

When the vibration frequency F1 is not equal to the vibration frequency F2, the vibration intensity S1 is not equal to the vibration intensity S2, or the vibration speed V1 is not equal to the vibration speed V2. Electronic equipment can calculate the average value of unequal parameters and use it as the vibration parameter of electronic equipment vibration. For example, assuming that only the vibration frequency F1 is not equal to the vibration frequency F2, the average value of the vibration frequency F1 and the vibration frequency F2 can be calculated and used as the target vibration frequency. Subsequently, the electronic equipment can vibrate according to the target vibration frequency, vibration intensity S2, and vibration speed V2, and control its temperature to reach temperature T1.

In some embodiments, it is assumed that the environmental information corresponding to a certain multimedia information includes wind speed information, wind level, temperature information, light information, humidity information and other environmental information. The electronic equipment can also determine the tactile feedback according to the multimedia information, wind speed information, temperature information, light information, humidity information and other environmental information in accordance with the corresponding strategy.

For example, the determined tactile feedback can be vibration frequency, vibration intensity, vibration speed, temperature, humidity, visibility, smoothness, etc. Wherein, the corresponding strategy can be preset by the developer according to certain rules, and the present invention does not limit the specific content of the corresponding strategy. Any strategy that can convert the corresponding multimedia information and environmental information into tactile feedback can be used to convert the corresponding multimedia information and environmental information into tactile feedback.

In some embodiments, developers can set corresponding algorithms for different multimedia information, and set corresponding algorithms for different environmental information. Electronic equipment can store the corresponding relationship between multimedia information and algorithms. Electronic equipment can also store the correspondence between environmental information and algorithms. When the multimedia information and environmental information are obtained, the algorithm corresponding to the multimedia information can be determined according to the corresponding relationship between the multimedia information and the algorithm. Determine the algorithm corresponding to the environmental information according to the corresponding relationship between the environmental information and the algorithm. And take the algorithm corresponding to the multimedia information and the algorithm corresponding to the environmental information as the preset strategy.

Wherein, according to a certain multimedia information, through its corresponding algorithm, the corresponding tactile feedback can be determined. According to the environmental information corresponding to the multimedia information, the corresponding tactile feedback can be determined through the algorithm corresponding to the environmental information. Tactile feedback determined based on multimedia information may be the same or different from that determined based on environmental information corresponding to multimedia information.

When the tactile feedback determined based on the multimedia information is different from the tactile feedback determined based on the environmental information corresponding to the multimedia information. A final tactile feedback can be determined by taking corresponding measures based on the tactile feedback determined based on the multimedia information and the tactile feedback determined based on the environmental information corresponding to the multimedia information. Use it as a tactile feedback determined based on the multimedia information and its corresponding environmental information.

In some embodiments, different multimedia information can be combined with different environmental information in pairs. And set the corresponding algorithm for the combined multimedia information and environmental information. According to the combined multimedia information and environmental information, through the algorithm corresponding to the combined multimedia information and environmental information, we can obtain the tactile feedback. When the multimedia information and its corresponding environmental information are obtained, the algorithm corresponding to the multimedia information and its corresponding environmental information can be determined. Use it as a preset strategy to obtain tactile feedback.

It is understandable that a piece of video can be composed of multiple video frames. In some embodiments, it is assumed that a seascape video is recorded, and in the process of obtaining each video frame of the seascape video. The environmental information of the current environment of the electronic equipment can be obtained as the environmental information corresponding to each video frame. Subsequently, according to each video frame and its corresponding environmental information, the corresponding tactile feedback of each video frame can be determined. When the operation of tactile multimedia output is received, the sea view video can be output, and when the corresponding video frame of the sea view video is output, the tactile feedback corresponding to the video frame is output.

It can also be understood that a piece of audio may be composed of multiple audio frames. In some embodiments, it is assumed that a piece of audio is obtained by recording, in the process of obtaining each audio frame of the piece of audio. The environmental information of the current environment of the electronic equipment can be obtained as the environmental information corresponding to each audio frame. Subsequently, according to each audio frame and its corresponding environmental information, the corresponding tactile feedback of each audio frame can be determined. When the operation of tactile multimedia output is received, the sea view audio can be output, and when the corresponding audio frame of the sea view audio is output, the tactile feedback corresponding to the audio frame is output.

It should be noted that the above is only an example of how to determine the tactile feedback based on the multimedia information and its corresponding environmental information, and is not intended to limit the present invention. In practical applications, it is also possible to determine the tactile feedback in other ways based on the multimedia information and its corresponding environmental information.

In some embodiments, the tactile feedback can include vibration frequency, vibration intensity, and vibration speed, and output corresponding tactile feedback effects can include:

Control the vibration member to vibrate at the vibration frequency, the vibration intensity, and the vibration speed.

For example, according to the multimedia information and environmental information, the corresponding vibration frequency, vibration intensity and vibration speed can be determined through a preset strategy. Therefore, when the tactile multimedia output operation is received, the multimedia information is output at the same time. Control the vibration member to vibrate with the vibration frequency, vibration intensity and vibration speed.

Wherein, electronic equipment may include a vibration member. The vibration member may be a motor such as a linear motor, piezoelectric ceramics, etc.

For example, assuming that the vibration frequency is F3, the vibration intensity is S3, and the vibration speed is V3. Then, while outputting multimedia information, control the vibration member to vibrate with vibration frequency F3, vibration intensity S3, and vibration speed V3. So as to bring users a tactile dimensional experience. For example, through vibration, the user can feel the shock and shock of the fireworks exploding on the spot, the soft feeling of the sea breeze touching the skin or cheeks, and so on.

In some embodiments, the tactile feedback also includes the target temperature, and controlling the vibration member according to the vibration frequency, the vibration intensity, and the vibration speed can include:

The vibration member is controlled to vibrate according to the vibration frequency, the vibration intensity, and the vibration speed. At the same time, control the temperature of the temperature control component to reach the target temperature.

For example, according to the multimedia information and environmental information, the corresponding vibration frequency, vibration intensity, vibration speed and target temperature can be determined through a preset strategy. Therefore, when the tactile multimedia output operation is received, the multimedia information is output at the same time. Control the vibration member to vibrate with the vibration frequency, vibration intensity and vibration speed. At the same time, the temperature of the temperature control component is controlled to reach the target temperature, so that the user can feel the corresponding vibration and temperature.

The electronic equipment may include the temperature control component, and the temperature control component may be made of temperature-controllable materials. The temperature control component can be heated or cooled under the control of the circuit. For example, assuming that the temperature of the temperature control component is 23° C., and the target temperature is 25° C. Then the temperature of the temperature control component can be controlled by the circuit to increase by 2° C.

In some embodiment, when the tactile feedback also includes humidity, viscosity, and roughness. Then, while controlling the vibration member to vibrate with the vibration frequency, the vibration intensity, and v the vibration speed, and controlling the temperature of the temperature control component to reach the target temperature, it can also control the electronic equipment to present the wetting effect corresponding to the humidity, the viscous effect corresponding to the viscosity, and the roughness effect corresponding to the roughness.

In some embodiments, based on multimedia information and environmental information, after determining the tactile feedback, you can also include:

According to multimedia information and tactile feedback, determine the tactile multimedia file.

Before outputting multimedia information and tactile feedback corresponding to the tactile feedback at the same time, you can also include:

Obtain multimedia information and tactile feedback according to the tactile multimedia files.

Wherein, the haptic multimedia file can include a header segment, a multimedia data segment, and a haptic feedback data segment. Wherein, the header segment is generally a fixed byte length, which mainly contains information such as time, the length of the multimedia data segment and the haptic feedback data segment, the type of the multimedia data segment and the haptic feedback data segment (including the original data type and the associated description type).

When the type of the multimedia data segment is the original data type, the multimedia data segment may include multimedia information. When the type of the multimedia data segment is an associated description type, the multimedia data segment may include description information that points to the associated multimedia information. When the type of the haptic feedback data segment is the original data type, the haptic feedback data segment may include tactile feedback. When the type of the haptic feedback data segment is an associated description type, the haptic feedback data segment can include description information that points to the associated tactile feedback.

For example, after a tactile multimedia file is obtained, the multimedia data segment and haptic feedback data segment of the tactile multimedia file can be obtained to obtain multimedia information and tactile feedback. Subsequently, the multimedia information can be output, and the tactile feedback effect corresponding to the tactile feedback can be output at the same time.

When the types of multimedia data segment and haptic feedback data segment are primitive data types. Multimedia information and tactile feedback can be obtained directly from the multimedia data segment and haptic feedback data segment.

When the types of the multimedia data segment and the haptic feedback data segment are associated description types, the description information that points to the associated multimedia information can be obtained from the multimedia data segment, such as the storage address of the multimedia information. You can also obtain the description information of the related tactile feedback from the haptic feedback data segment, such as the storage address of the tactile feedback. Subsequently, according to the storage address of the multimedia information, the multimedia information can be obtained, and according to the storage address of the tactile feedback, the tactile feedback can be obtained.

In some embodiments, after the tactile multimedia file is obtained, the tactile multimedia file can also be sent to other electronic equipment. When other electronic equipment receives a tactile multimedia output operation, it can also obtain multimedia information and tactile feedback according to the tactile multimedia file. Thus, the multimedia information can be output, and the tactile feedback effect corresponding to the tactile feedback can be output at the same time. In turn, it can bring multiple dimensions of experience to users who use other electronic equipment.

In some embodiments, after determining the tactile feedback based on multimedia information and environmental information, it may also include:

Store multimedia information and tactile feedback in association.

Before outputting multimedia information and tactile feedback corresponding to the tactile feedback at the same time, you can also include:

Obtain the multimedia information and tactile feedback of the associated storage.

When you need to output multimedia information and its corresponding tactile feedback, you can quickly obtain multimedia information and its corresponding tactile feedback, and you can associate the multimedia information with the tactile feedback. Therefore, when the tactile multimedia output operation is received, the multimedia information and the tactile feedback of the associated storage can be obtained. And output the multimedia information, and output the corresponding tactile feedback effect at the same time.

In some embodiments, after getting the multimedia information and tactile feedback of the associative storage, the multimedia information and the tactile feedback of the associative storage can also be sent to other electronic equipment. When other electronic equipment receives the tactile multimedia output operation, it can also obtain the multimedia information and tactile feedback stored in the associated storage. And output the multimedia information, and output the corresponding tactile feedback effect at the same time.

In some embodiment, obtain multimedia information, including:

When receiving record instruction or shooting instructions, the recording or shooting will obtain multimedia information.

Obtain the environmental information corresponding to multimedia information, including:

In the process of recording or shooting to obtain multimedia information, obtain the environmental information of the current environment.

For example, when the user clicks the recording button or shooting button on the electronic equipment, the electronic equipment receives the record instruction or shooting instructions. When receiving record instruction or shooting instructions, you can record or shoot to obtain multimedia information. In the process of obtaining multimedia information during recording or shooting, the environmental information of the current environment of the electronic equipment can be obtained and used as the environmental information of the current environment.

In some embodiments, the information processing method may also include:

When receiving a multimedia output operation, output multimedia information.

For example, the screen of electronic equipment can display multiple logos corresponding to multimedia information. The user can click on the logo corresponding to a certain multimedia information, and the electronic equipment can generate and display a prompt message. The prompt information is used to prompt the user to choose to output tactile multimedia or output pure multimedia. When the user chooses to output pure multimedia, the electronic equipment receives the multimedia output operation. When receiving a multimedia output operation, the electronic equipment can only output multimedia information, but not the corresponding tactile feedback effect at the same time. When the user chooses to output tactile multimedia, the electronic equipment receives the tactile multimedia output operation. Thus, electronic equipment can output multimedia information and at the same time output the corresponding tactile feedback effect.

It is understandable that only outputting multimedia information can save the battery power of electronic equipment. At the same time, outputting multimedia information and tactile feedback corresponding to the tactile feedback effect can bring users a more dimensional experience. Therefore, users can choose whether to output only multimedia information or simultaneously output multimedia information and the tactile feedback corresponding to the tactile feedback effect according to actual needs.

In some embodiments, before outputting multimedia information and tactile feedback corresponding to the tactile feedback at the same time, you can also include:

Detect whether the user's skin is in contact with electronic equipment.

Output multimedia information, and output the corresponding tactile feedback effect at the same time, which can include:

When the user's skin is in contact with electronic equipment, the multimedia information is output, and the tactile feedback effect corresponding to the tactile feedback is output at the same time.

Considering that when the user's skin is not in contact with the electronic equipment, outputting the tactile feedback effect corresponding to the tactile feedback does not give the user a tactile experience. In order to save the battery power of the electronic equipment, it can further detect whether the user's skin is in contact with the electronic equipment when the tactile multimedia output operation is received. If the user's skin is in contact with the electronic equipment, the multimedia information and the tactile feedback effect corresponding to the tactile feedback can be output at the same time.

In some embodiments, information processing methods can also include:

When the user's skin is not in contact with electronic equipment, multimedia information is output.

Considering that when the user's skin is not in contact with the electronic equipment, outputting the tactile feedback effect corresponding to the tactile feedback does not give the user a tactile experience. In order to save the battery power of the electronic equipment, it can further detect whether the user's skin is in contact with the electronic equipment when the tactile multimedia output operation is received. If the user's skin is not in contact with electronic equipment, only multimedia information can be output.

In some embodiments, before outputting multimedia information and tactile feedback corresponding to the tactile feedback at the same time, you can also include:

Check whether the current remaining power of electronic equipment is greater than the preset power.

Output multimedia information, and output the corresponding tactile feedback effect at the same time, which can include:

When the current remaining power of electronic equipment is greater than the preset power, the multimedia information will be output, and the corresponding tactile feedback effect will be output at the same time.

Outputting the tactile feedback corresponding to the tactile feedback effect will consume the battery power of the electronic equipment. Then, when the current remaining power of the electronic equipment is high, the multimedia information and the tactile feedback corresponding to the tactile feedback effect can be output at the same time. Wherein, the preset power can be set by the user, or can be generated by electronic equipment according to some rules, and there is no specific limitation here.

In some embodiments, information processing methods can also include:

If the current remaining power of the electronic equipment is less than or equal to the preset power, the multimedia information is output.

Outputting the tactile feedback corresponding to the tactile feedback effect will consume the battery power of the electronic equipment. Then, when the current remaining power of the electronic equipment is low, only the multimedia information can be output to increase the battery life.

Figure 2:
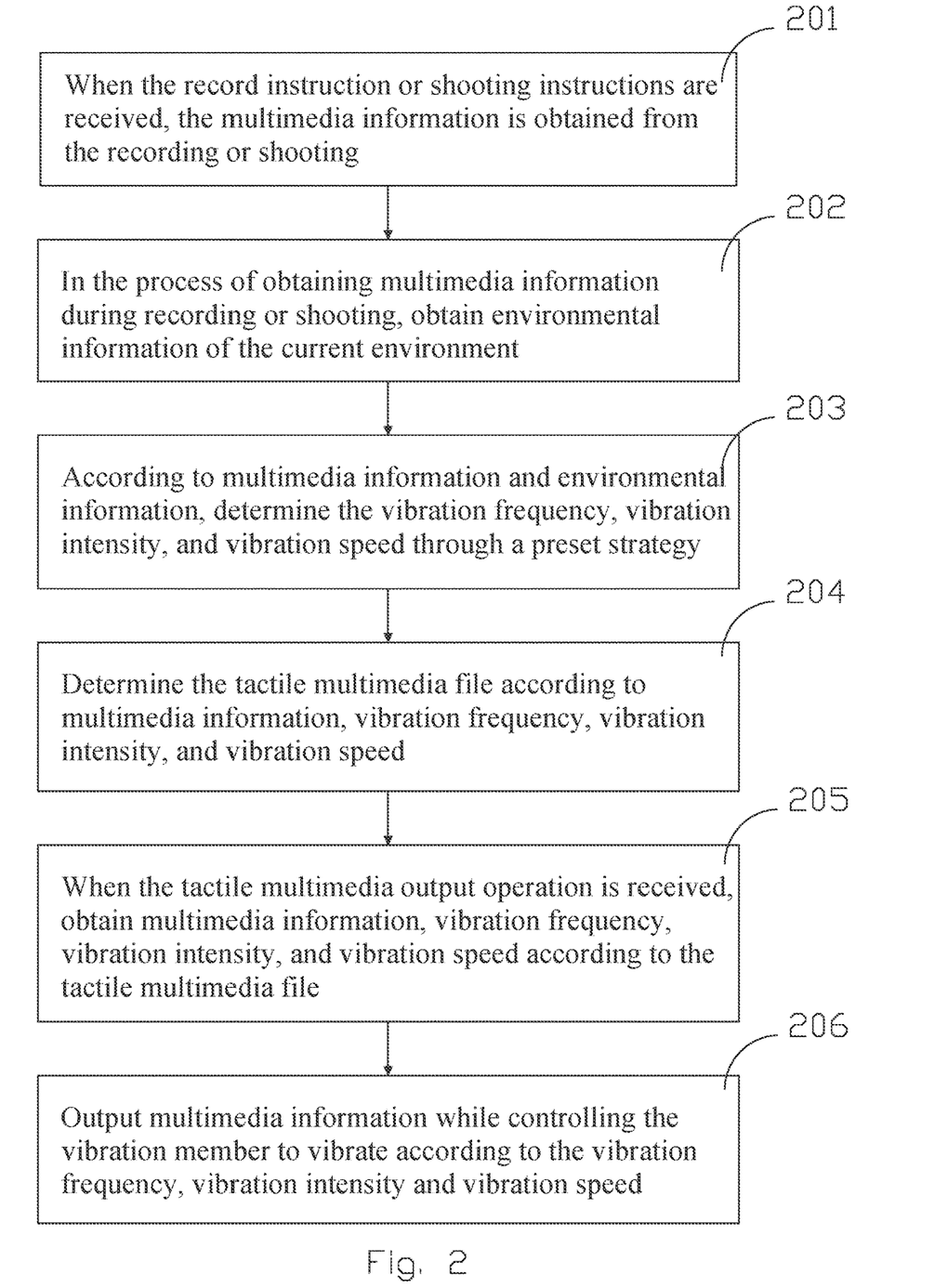
FIG. 2 is a flow chart of an information processing method in accordance with a second exemplary embodiment of the present invention.

Please refer to FIG. 2. FIG. 2 is a schematic view of the second flow of the information processing method provided by the embodiment of the present invention. The process can include:

201. When the record instruction or shooting instructions are received, the multimedia information is obtained from the recording or shooting.

For example, when a user is watching a firework show, he can click the record button or the shooting button on the electronic equipment to record or shoot a video of the firework show or a picture of the firework show.

For another example, when the user is watching the sea, he can click the record button or the shooting button on the electronic equipment to record or shoot a sea view video or sea view picture.

202. In the process of obtaining multimedia information during recording or shooting, obtain environmental information of the current environment.

For example, in the process of recording or shooting a firework show video or firework show picture, the environmental information of the current environment of the electronic equipment can be obtained. The environmental information may include sound information, such as the sound made when the fireworks are blooming, the human voice around the user, and so on.

For another example, in the process of recording or shooting a sea view video or sea view picture, the environmental information of the current environment of the electronic equipment can be obtained. The environmental information may include sound information, such as the sound intensity of ocean waves. The environmental information may also include wind speed information, such as sea breeze speed.

203. According to multimedia information and environmental information, determine the vibration frequency, vibration intensity, and vibration speed through a preset strategy.

For example, taking multimedia information as a seascape picture, and environmental information including the sound intensity P of the waves and the speed R of the sea breeze as an example, the electronic equipment pre-stores the strategy corresponding to the seascape picture. For example, the strategy can include the vibration frequency, vibration intensity, and vibration speed corresponding to the seascape image. According to the strategy corresponding to the sea view picture and the sea view picture, the corresponding vibration frequency, vibration intensity and vibration speed can be determined. The strategy corresponding to the sound intensity of the waves is also pre-stored in the electronic equipment. For example, the strategy can include different sound intensity and their corresponding vibration frequency, vibration intensity, and vibration speed. According to the corresponding strategy of the sound intensity of the waves and the sound intensity of the waves, the corresponding vibration frequency, vibration intensity and vibration speed can be determined. The electronic equipment also stores in advance the strategy corresponding to the speed of the sea breeze. For example, the strategy can include different speeds and their corresponding vibration frequency, vibration intensity, and vibration speed. According to the corresponding strategy of sea breeze speed and sea breeze speed, the corresponding vibration frequency, vibration intensity and vibration speed can be determined. The strategy corresponding to the seascape picture, the strategy corresponding to the sound intensity of the waves, and the strategy corresponding to the speed of the sea breeze can be used as preset strategies.

After the seascape picture, the sound intensity P of the sea waves, and the speed R of the sea breeze are obtained, the vibration frequency, vibration intensity, and vibration speed corresponding to the seascape picture can be determined according to the strategy corresponding to the seascape picture. The vibration frequency, vibration intensity, and vibration speed corresponding to the sound intensity P of the sea wave can be determined according to the strategy corresponding to the sound intensity of the sea wave. The vibration frequency, vibration intensity, and vibration speed corresponding to the speed R of the sea breeze can be determined according to the strategy corresponding to the speed of the sea breeze. Subsequently, the average value of the vibration frequency corresponding to the seascape picture, the vibration frequency corresponding to the sound intensity P of the sea wave, and the vibration frequency corresponding to the speed R of the sea breeze can be calculated to obtain the target vibration frequency. The average value of the vibration intensity corresponding to the seascape picture, the vibration intensity corresponding to the sound intensity P of the sea wave, and the vibration intensity corresponding to the speed R of the sea breeze can be calculated to obtain the target vibration intensity. The average value of the vibration speed corresponding to the seascape picture, the vibration speed corresponding to the sound intensity P of the sea wave, and the vibration speed corresponding to the speed R of the sea breeze can be calculated to obtain the target vibration speed. Use the target vibration frequency, target vibration intensity, and target vibration speed as the speed according to the seascape picture, the sound of the waves and the sea breeze, and determine the vibration frequency, vibration intensity, and vibration speed through a preset strategy.

In some embodiments, after determining the vibration frequency, vibration intensity, and vibration speed corresponding to the seascape picture; the vibration frequency, vibration intensity, and vibration speed corresponding to the sound intensity P of the sea wave; and the vibration frequency and vibration intensity and vibration speed corresponding to the speed R of the sea breeze, a prompt message can be generated and displayed. The prompt information is used to prompt the user to select the tactile feedback effect corresponding to the seascape picture, the tactile feedback effect corresponding to the sound intensity of the sea wave, or the tactile feedback effect corresponding to the speed of the sea breeze. When the user selects the tactile feedback effect corresponding to the seascape picture, the vibration frequency, vibration intensity, and vibration speed corresponding to the seascape picture can be used as the speed according to the seascape picture, the sound of the waves, and the sea breeze. Through the preset strategy, determine the vibration frequency, vibration intensity and vibration speed. When the user selects the vibration frequency, vibration intensity and vibration speed corresponding to the intensity P of the sound of the waves. The vibration frequency, vibration intensity and vibration speed corresponding to the sound intensity of the waves can be used as the speed according to the seascape picture, the sound of the waves and the sea breeze. Determine the vibration frequency, vibration intensity and vibration speed through preset strategies. When the user selects the vibration frequency, vibration intensity and vibration speed corresponding to the speed R of the sea breeze. The vibration frequency, vibration intensity, and vibration speed corresponding to the speed of the sea breeze can be used as the speed according to the seascape picture, the sound of the waves and the sea breeze. Determine the vibration frequency, vibration intensity and vibration speed through preset strategies.

204. Determine the tactile multimedia file according to multimedia information, vibration frequency, vibration intensity, and vibration speed.

Taking multimedia information as a seascape picture, environmental information includes the sound intensity P of the waves and the speed R of the sea breeze as examples. Assuming that the vibration frequency F4, vibration intensity S4, and vibration speed V4 are obtained according to the seascape picture, the sound intensity P of the sea waves, and the speed R of the sea breeze. Then, the haptic multimedia file D determined according to the seascape picture, the vibration frequency F4, the vibration intensity S4, and the vibration speed V4 may include a header segment, a multimedia data segment, and a haptic feedback data segment. Wherein, the header segment is generally a fixed byte length, which mainly contains information such as time, the length of the multimedia data segment and the haptic feedback data segment, the type of the multimedia data segment and the haptic feedback data segment (including the original data type and the associated description type). Assuming that the type of the multimedia data segment of the tactile multimedia file D is the original data type, the multimedia data segment may include seascape pictures. Assuming that the type of the haptic feedback data segment of the haptic multimedia file D is the original data type, the haptic feedback data segment may include vibration frequency F4, vibration intensity S4, and vibration speed V4.

After the tactile multimedia file D is obtained, the tactile multimedia file D can be stored.

It is understandable that according to the same process as the above process, other multimedia information and corresponding tactile feedback can also be used to obtain other tactile multimedia files, so that multiple tactile multimedia files can be obtained.

205. When the tactile multimedia output operation is received, obtain multimedia information, vibration frequency, vibration intensity, and vibration speed according to the tactile multimedia file.

The screen of electronic equipment can display multiple tactile multimedia file logos. After the user clicks on a tactile multimedia file logo, the electronic equipment receives the tactile multimedia output operation. For example, assuming that the user clicks on the tactile multimedia file D, and electronic equipment can obtain the tactile multimedia file D. The seascape picture is obtained from the multimedia data segment of the haptic multimedia file D, and the vibration frequency F4, the vibration intensity S4, and the vibration speed V4 are obtained from the haptic feedback data segment of the haptic multimedia file D.

206. Output multimedia information while controlling the vibration member to vibrate according to the vibration frequency, vibration intensity and vibration speed.

After the seascape picture, vibration frequency F4, vibration intensity S4, and vibration speed V4 are obtained, the seascape picture can be displayed on the screen of the electronic equipment. And control the vibration member of electronic equipment, such as linear motor vibrating according to vibration frequency F4, vibration intensity S4 and vibration speed V4. This allows users to experience the sound intensity of sea waves and the speed of sea breeze by feeling the vibration of electronic equipment while watching seascape pictures.

Figure 3:
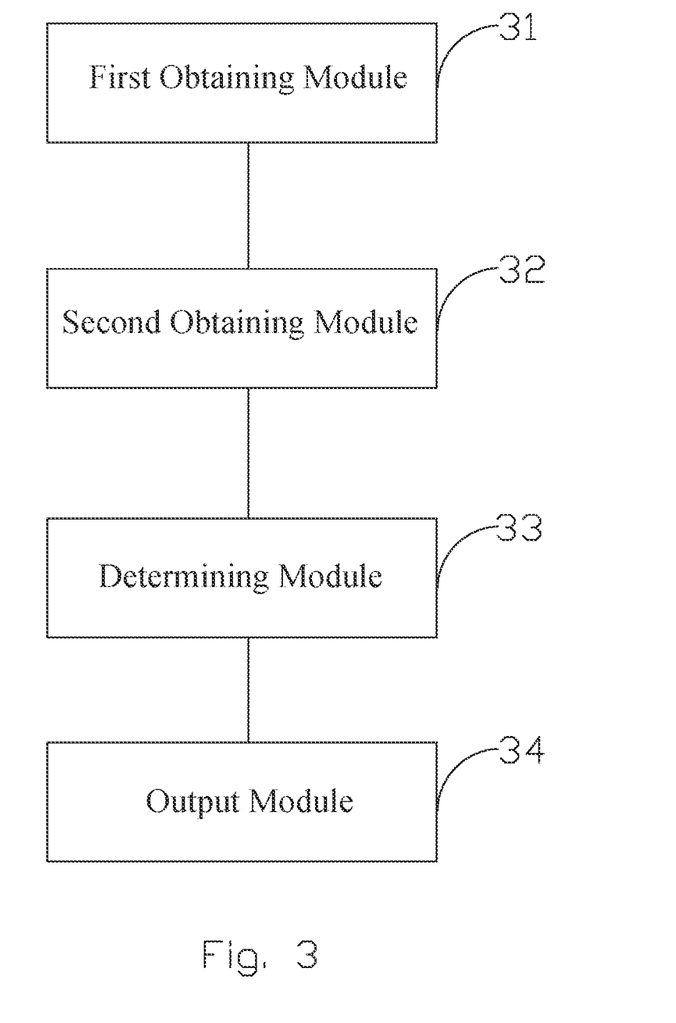
FIG. 3 illustrates an information processing device performing the information processing method.

Please refer to FIG. 3, which is a schematic structural view of an information processing device provided by an embodiment of the present invention. The information processing device may include: a first obtaining module 31, a second obtaining module 32, a determining module 33 and an output module.

The first obtaining module 31 is used to obtain multimedia information.

The second obtaining module 32 is used to obtain environmental information corresponding to the multimedia information.

The determining module 33 is used to determine the tactile feedback according to the multimedia information and the environmental information.

The output module 34 is used for outputting the multimedia information when receiving the tactile multimedia output operation, and at the same time outputting the tactile feedback effect corresponding to the tactile feedback.

In some embodiments, module 33 is determined, which can be used to: According to the multimedia information and the environmental information, determine the tactile feedback through a preset strategy.

In some embodiments, the tactile feedback includes vibration frequency, vibration intensity, and vibration speed. the output module 34 can be used for: The vibration member is controlled to vibrate in accordance with the vibration frequency, the vibration intensity, and the vibration speed.

In some embodiments, the tactile feedback also includes the target temperature, output module 34, which can be used to: Control the vibration member to vibrate according to the vibration frequency, the vibration intensity, and the vibration speed, while controlling the temperature of the temperature control component to reach the target temperature.

In some embodiments, module 33 is determined, which can be used to: According to the multimedia information and the tactile feedback, determine a tactile multimedia file.

The output module 34 can be used to: According to the tactile multimedia file, the multimedia information and the tactile feedback are obtained.

In some embodiments, module 33 is determined, which can be used to: The multimedia information and the tactile feedback are stored in association.

The output module 34 can be used to: Obtain the multimedia information and the tactile feedback stored in association.

In some embodiments, module 31 is obtained first, which can be used to: When receiving record instruction or shooting instructions, the recording or shooting will obtain multimedia information.

The second obtaining module 32 can be used to: In the process of recording or shooting to obtain multimedia information, obtain the environmental information of the current environment.

The information processing device provided by the embodiment is used to implement the information processing method described in the above embodiment. For the function of each module, please refer to the corresponding description in the method embodiment. Its implementation principle and technical effect are similar, so I won't repeat it here.

Figure 4:
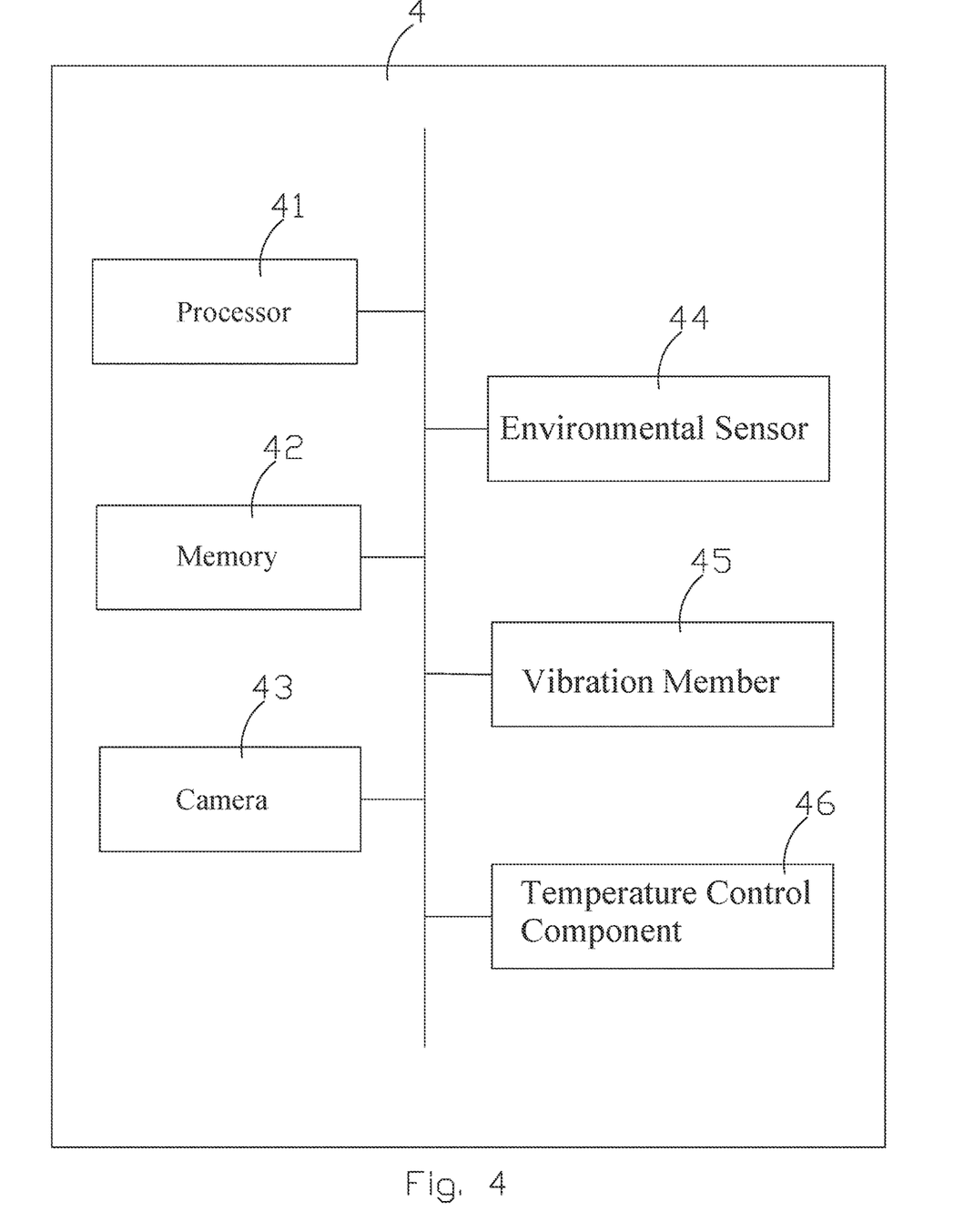
FIG. 4 illustrates an electronic equipment incorporating the information processing device.

FIG. 4 is a schematic view of electronic equipment provided by the embodiment of the present invention. As shown in FIG. 4, the electronic equipment 4 of this embodiment includes a processor 40, a memory 41, and a computer program stored in the memory 41 and running on the processor 40, such as an information processing program. When the processor 40 executes the computer program, the steps in the above-mentioned information processing method embodiment are implemented, for example, steps 101 to 104 shown in FIG. 1. Alternatively, when the processor 40 executes the computer program, the function of each module in the above-mentioned device embodiment is realized, for example, the functions of modules 31 to 34 shown in FIG. 3.

Exemplarily, the computer program may be divided into one or more modules/units, and the one or more modules/units are stored in the memory 41 and executed by the processor 40 to complete the present invention. The one or more modules/units may be a series of computer program instruction segments capable of completing specific functions, and the instruction segments are used to describe the execution process of the computer program in the electronic equipment 4. For example, the computer program can be divided into a first obtaining module, a second obtaining module, a determining module, and an output module (unit module in the virtual device). the specific functions of each module are as follows:

- a first obtaining module, which is used to obtain the multimedia information.
- a second obtaining module, which is used to obtain environmental information corresponding to the multimedia information.
- a determining module, which is used to determine the tactile feedback according to the multimedia information and the environmental information.
- an output module, which is used to output the multimedia information when receiving the tactile multimedia output operation, and at the same time output the tactile feedback effect corresponding to the tactile feedback.

The electronic equipment 4 can be computing equipment such as desktop computers, notebooks, palmtop computers, and cloud servers. The electronic equipment 4 may include, but is not limited to, a processor 40 and a memory 41. Those skilled in the art can understand that FIG. 4 is only an example of electronic equipment 4, and does not constitute a limitation on electronic equipment 4. It may include more or less components than those shown in the figure, or a combination of certain components, or different components. For example, electronic equipment 4 may also include a camera 42, an environmental sensor 43 (including an temperature sensor, an humidity sensor, an air pressure sensor, a wind speed sensor or a sound sensor (such as a microphone)), a vibration member 44, a temperature control component 45, and so on.

The processor 40 can be a central processing unit (Central Processing Unit, CPU), other general-purpose processors, digital signal processors (Digital Signal Processors, DSP), application specific integrated circuits (ASICs), ready-made programmable gate arrays (Field-Programmable Gate Array, FPGA) or other programmable logic devices, discrete gates or transistor logic devices, discrete hardware components, etc. The general processor can be a microprocessor or the processor can also be any conventional processor, etc.

The memory 41 may be an internal storage unit of the electronic equipment 4, such as a hard disk or a memory of the electronic equipment 4. The memory 41 may also be an external storage device of the electronic equipment 4. For example, the plug-in hard disk, Smart Media Card (SMC), Secure Digital (SD), and Flash Card (Flash Card) equipped on the electronic equipment 4. Further, the memory 41 may also include both an internal storage unit of the electronic equipment 4 and an external storage device. The memory 41 is used to store the computer program and other programs and data required by the electronic equipment 4. The memory 41 can also be used to temporarily store data that has been output or will be output.

Those skilled in the art can clearly understand that, for convenience and conciseness of description, only the division of the above-mentioned functional units and modules is used as an example for illustration. In actual applications, the above-mentioned function allocation can be completed by different functional units or modules according to needs, that is, the internal structure of the electronic equipment is divided into different functional units or modules to complete all or part of the above-described functions. Each functional unit and module in the embodiment may be integrated into one processing unit, or each unit may exist separately and physically. It is also possible to integrate two or more units into one unit, and the above-mentioned integrated unit can be implemented in the form of hardware or software functional unit. In addition, the specific names of each functional unit and module are only for the convenience of distinguishing each other, and are not used to limit the protection scope of the present invention. For the specific working process of the unit and module in the above system, please refer to the corresponding process in the aforementioned method embodiment, which will not be repeated here.

In the above-mentioned embodiment, the description of each embodiment has its own emphasis. For the part that is not detailed or recorded in an embodiment, please refer to the relevant description of other embodiments.

A person of ordinary skill in the art may be aware that the units and algorithm steps of the examples described in combination with the embodiment disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered as going beyond the scope of the present invention.

In the embodiment provided by the present invention, it should be understood that the disclosed device/electronic equipment and method can be implemented in other ways. For example, the device/electronic equipment described above is only illustrative. For example, the division of modules or units is only a logical function division. In actual implementation, there may be other division methods, for example, multiple units or components may be combined or integrated into another system. Or some features can be ignored or not implemented. On the other hand, the displayed or discussed mutual coupling or direct coupling or communication connection may be through some interfaces. The indirect coupling or communication connection of a device or unit can be electrical, mechanical or other forms.

The units described as separation parts may or may not be physically separated, and the parts displayed as units may or may not be physical units. It can be located in one place, or it can be distributed to multiple network units. Some or all of the units can be selected according to actual needs to achieve the purpose of this embodiment solution.

In addition, each functional unit in each embodiment of the present invention can be integrated into one processing unit. Each unit may exist alone physically, or two or more units may be integrated into one unit. The above-mentioned integrated unit can be implemented in the form of hardware or software functional unit.

If the integrated module/unit is implemented in the form of a software functional unit and sold or used as an independent product, it can be stored in a computer readable storage medium. Based on this understanding, the present invention implements all or part of the processes in the above-mentioned embodiment method. It can also be done by instructing the relevant hardware through a computer program. The computer program can be stored in a computer-readable storage medium. When the computer program is executed by the processor, it can implement the steps of the embodiment of the above-mentioned methods. Wherein, the computer program includes computer program code, and the computer program code may be in the form of source code, object code, executable file, or some intermediate forms. The computer-readable medium may include: Any entity or device capable of carrying the computer program code, recording medium, U disk, mobile hard disk, magnetic disk, optical disk, computer memory, read-only memory (Read-Only Memory, ROM), random access memory (Random Access Memory, RAM), electrical carrier signals, electrical signals, and software distribution media. It should be noted that the content accommodated in the computer-readable medium can be appropriately increased or decreased in accordance with the requirements of the legislation and patent practices in the jurisdiction. For example, in some jurisdictions, according to legislation and patent practices, computer-readable media do not include electrical carrier signals and electrical signals.

It should be understood that the size of the sequence number of each step in the above-mentioned embodiment does not mean the order of execution. The execution sequence of each process should be determined by its function and internal logic, and should not constitute any limitation on the implementation process of the embodiment of the present invention.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An information processing method, including:
obtaining multimedia information;
obtaining environmental information corresponding to the multimedia information;
determining tactile feedback according to the multimedia information and the environmental information;
when a tactile multimedia file output operation is received, outputting the multimedia information, and outputting a tactile feedback effect corresponding to the tactile feedback at the same time, wherein
the tactile multimedia file is determined by the multimedia information and the tactile feedback;
before the step of outputting of the multimedia information and the tactile feedback effect corresponding to the tactile feedback at the same time, the information processing method further includes a step:
detect whether the user's skin is in contact with electronic equipment, output multimedia information and the corresponding tactile feedback effect;
if the user's skin is in contact with electronic equipment, output multimedia information and the corresponding tactile feedback effect;
if the user's skin is not in contact with the electronic equipment, output multimedia information only.

2. The information processing method as described in claim 1, wherein: the step of determining the tactile feedback according to the multimedia information and the environmental information includes:
determining the tactile feedback through a preset strategy according to the multimedia information and the environmental information.

3. The information processing method as described in claim 1, wherein: the tactile feedback includes a vibration frequency, a vibration intensity, and a vibration speed; the step of outputting of the tactile feedback effect corresponding to the tactile feedback includes:
controlling a vibration member to vibrate in accordance with the vibration frequency, the vibration intensity, and the vibration speed.

4. The information processing method as described in claim 3, wherein: the tactile feedback further includes a target temperature; the step of controlling the vibration member according to the vibration frequency, the vibration intensity, and the vibration speed includes:
controlling the vibration member in accordance with the vibration frequency, the vibration intensity, and the vibration speed;
controlling the temperature of a temperature control component for reaching the target temperature.

5. The information processing method as described in claim 1, wherein
before the step of outputting of the multimedia information and the tactile feedback effect corresponding to the tactile feedback at the same time, the method further includes a step:
according to the tactile multimedia file, obtaining the multimedia information and the tactile feedback.

6. The information processing method as described in claim 1, further including a step after the step of determining the tactile feedback according to the multimedia information and the environmental information:
storing the multimedia information and the tactile feedback in association;
before the step of outputting of the multimedia information and the tactile feedback effect corresponding to the tactile feedback at the same time, the method further includes a step:
obtaining the multimedia information and the tactile feedback stored in association.

7. The information processing method as described in claim 1, wherein: the step of obtaining of multimedia information includes:
when receiving record instruction or shooting instructions, obtaining the multimedia information by recording or shooting;
the step of obtaining environmental information corresponding to the multimedia information includes:
in the process of recording or shooting to obtain multimedia information, obtaining the environmental information of the current environment.

8. An electronic equipment, including a memory, a processor, and a computer program stored in the memory and running on the processor; wherein: the processor implements steps of the information processing method as described in claim 1 when the computer program is executed.

* * * * *